United States Patent
Zhu et al.

(10) Patent No.: US 12,450,888 B2
(45) Date of Patent: Oct. 21, 2025

(54) HIERARCHICAL AUDIO-VISUAL FEATURE FUSING METHOD FOR AUDIO-VISUAL QUESTION ANSWERING AND PRODUCT

(71) Applicant: Tsinghua University, Beijing (CN)

(72) Inventors: Wenwu Zhu, Beijing (CN); Xin Wang, Beijing (CN); Pinci Yang, Beijing (CN)

(73) Assignee: Tsinghua University, Beijing (CN)

( * ) Notice: Subject to any disclaimer, the term of this patent is extended or adjusted under 35 U.S.C. 154(b) by 415 days.

(21) Appl. No.: 18/144,274

(22) Filed: May 8, 2023

(65) Prior Publication Data

US 2024/0046628 A1    Feb. 8, 2024

(30) Foreign Application Priority Data

Aug. 5, 2022 (CN) .......................... 202210936845.6

(51) Int. Cl.
*G06V 10/00* (2022.01)
*G06V 10/80* (2022.01)

(52) U.S. Cl.
CPC ................................ *G06V 10/806* (2022.01)

(58) Field of Classification Search
CPC ............ G06N 3/02; G06N 3/08; G06N 3/042; G06N 3/045; G06N 3/047; G06N 3/082; G06N 3/088; G06N 3/092; G06N 3/0454; G06N 3/0475; G06N 3/0464; G06N 20/00; G06N 20/10; G06N 20/20; G06V 10/82; G06V 10/80; G06V 10/806; G06F 18/25; G10L 15/1822; G10L 15/063; G10L 15/16; G10L 15/26; G10L 25/30; G10L 25/57; G10L 2015/0631; Y02T 10/40

See application file for complete search history.

(56) References Cited

U.S. PATENT DOCUMENTS

| | | | | |
|---|---|---|---|---|
| 8,934,722 B2 * | 1/2015 | Peleg | ...................... | G06F 18/41 382/224 |
| 9,355,336 B1 * | 5/2016 | Jahagirdar | ........... | G06V 30/268 |
| 10,192,129 B2 * | 1/2019 | Price | ..................... | G06V 10/454 |
| 10,402,697 B2 * | 9/2019 | Yang | ..................... | G06N 3/044 |
| 11,341,366 B2 * | 5/2022 | Niu | ....................... | G06V 10/764 |
| 11,804,060 B1 * | 10/2023 | Zhao | ................... | G06F 18/2415 |
| 12,210,835 B2 * | 1/2025 | Xiong | ................... | G06F 40/284 |
| 12,333,794 B2 * | 6/2025 | Wasnik | ................ | G06V 40/161 |
| 12,340,571 B2 * | 6/2025 | Mangla | .................. | G06V 10/82 |
| 12,361,679 B1 * | 7/2025 | Garg | ...................... | G06V 10/82 |
| 2023/0136515 A1 * | 5/2023 | Wu | ......................... | G06F 18/21 382/157 |
| 2024/0046628 A1 * | 2/2024 | Zhu | ....................... | G06V 10/82 |

* cited by examiner

*Primary Examiner* — Amir Alavi
(74) *Attorney, Agent, or Firm* — Bayramoglu Law Offices LLC

(57) ABSTRACT

A hierarchical audio-visual feature fusing method for audio-visual question answering and a product relate to the field of audio-visual question answering. By fusing audio embedding in an input video clip with a baseline model as well as video embedding and question embedding respectively at an early stage, a middle stage and a late stage in a hierarchical feature fusing process, a first answer probability distribution, a second answer probability distribution and a third answer probability distribution are obtained, and the answer probability distributions are added based on preset weights, and then averaged for hierarchical integration to generate a final answer.

20 Claims, 4 Drawing Sheets

HIERARCHICAL AUDIO-VISUAL FEATURE FUSING METHOD FOR AUDIO-VISUAL QUESTION ANSWERING AND PRODUCT

CROSS-REFERENCE TO THE RELATED APPLICATIONS

This application is based upon and claims priority to Chinese Patent Application No. 202210936845.6, filed on Aug. 5, 2022, the entire contents of which are incorporated herein by reference.

TECHNICAL FIELD

Embodiments of the present disclosure relate to the field of audio-visual question answering and, more particularly, to a hierarchical audio-visual feature fusing method for audio-visual question answering and a product.

BACKGROUND

Audio-visual question answering aims to answer questions by referring to audio and visual information contained in video clips at the same time. Compared with purely visual question answering tasks (such as picture question answering and video question answering), question settings in audio-visual question answering tasks cannot always get a correct answer only by single modality (only audio or only visual) information.

However, a current audio-visual question answering system is usually based on a former purely visual model framework, which only fuses audio features at an input or output position of a model, and thus lacks exploration of an effective mechanism of audio-visual feature fusing. On one hand, problems such as insufficient question answering capability are caused, and only suboptimal solutions are obtained. On the other hand, a complex semantic understanding performance in a real scene is reduced due to less design of an audio characterization module and an audio-visual fusing module, and is difficult to approach an understanding level of human. Therefore, how to realize the effective fusing of video features and audio features and increase a proportion of the audio characterization module in the audio-visual question answering system has become an urgent problem to be solved.

SUMMARY

Embodiments of the present disclosure provide a hierarchical audio-visual feature fusing method for audio-visual question answering and a product, aiming at solving a problem of few audio characterization modules and a problem that video features and audio features cannot be effectively fused.

A first aspect of the embodiments of the present disclosure provides a hierarchical audio-visual feature fusing method for audio-visual question answering, including:
  inputting an audio-video dual-modality feature into a baseline model, fusing the audio-video dual-modality feature processed by the baseline model with question embedding, and then performing answer decoding to obtain a first answer probability distribution;
  inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to its own structure;
  inputting a video-question dual-modality feature into the baseline model, fusing the video-question dual-modality feature processed by the baseline model with the audio embedding, and then performing answer decoding to obtain a third answer probability distribution; and
  performing hierarchical integration on the first answer probability distribution, the second answer probability distribution and the third answer probability distribution obtained to generate a final answer.

Optionally, performing hierarchical integration on the first answer probability distribution, the second answer probability distribution and the third answer probability distribution obtained to generate the final answer includes:
  adding and then averaging the first answer probability distribution, the second answer probability distribution and the third answer probability distribution obtained based on the preset weights to obtain the final answer, wherein a preset weight of the first answer probability distribution, a preset weight of the second answer probability distribution and a preset weight of the third answer probability distribution are equal.

Optionally, inputting the audio-video dual-modality feature into the baseline model, fusing the audio-video dual-modality feature processed by the baseline model with the question embedding, and then performing answer decoding to obtain the first answer probability distribution includes:
  inputting the audio embedding and the video embedding into a first fusing module to obtain the audio-video dual-modality feature;
  inputting the audio-video dual-modality feature into the baseline model;
  inputting the audio-video dual-modality feature processed by the baseline model and the question embedding into the first fusing module to obtain a first three-modality feature; and
  inputting the first three-modality feature into a first answer decoder for answer decoding to obtain the first answer probability distribution.

Optionally, inputting the video embedding and the question embedding into the first baseline model, fusing the video single modality feature and the question single modality feature processed by the first baseline model with the audio embedding, and then inputting the same into the second baseline model, and then performing the answer decoding on the second baseline model to obtain the second answer probability distribution includes:
  inputting the video embedding and the question embedding into the first baseline model;
  inputting the video single modality feature and the question single modality feature respectively processed by the first baseline model and the audio embedding into a second fusing module to obtain a second three-modality feature;
  inputting the second three-modality feature into the second baseline model; and
  inputting the second three-modality feature processed by the second baseline model into a second answer decoder for answer decoding to obtain the second answer probability distribution.

Optionally, inputting the video-question dual-modality feature into the baseline model, fusing the video-question dual-modality feature processed by the baseline model with the audio embedding, and then performing answer decoding to obtain the third answer probability distribution includes:

inputting the video embedding and the question embedding into a third fusing module to obtain the video-question dual-modality feature;

inputting the video-question dual-modality feature into the baseline model;

inputting the video-question dual-modality feature processed by the baseline model and the audio embedding into the third fusing module to obtain a third three-modality feature; and inputting the third three-modality feature into a third answer decoder for answer decoding to obtain the third answer probability distribution.

Optionally, the method further includes:

the video embedding being a video data vector obtained by mathematically processing video information in a video clip based on a video preset algorithm;

the audio embedding being an audio data vector obtained by mathematically processing audio information in the video clip based on an audio preset algorithm; and the question embedding being a question data vector obtained by mathematically processing question information corresponding to the video clip based on a question preset algorithm.

A second aspect of the embodiments of the present disclosure provides a hierarchical audio-visual feature fusing apparatus for audio-visual question answering, including:

a first fusing module configured for inputting an audio-video dual-modality feature into a baseline model, fusing the audio-video dual-modality feature processed by the baseline model with question embedding, and then performing answer decoding to obtain a first answer probability distribution;

a second fusing module configured for inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to its own structure;

a third fusing module configured for inputting a video-question dual-modality feature into the baseline model, fusing the video-question dual-modality feature processed by the baseline model with the audio embedding, and then performing answer decoding to obtain a third answer probability distribution; and an answer integration module configured for performing hierarchical integration on the first answer probability distribution, the second answer probability distribution and the third answer probability distribution obtained to generate a final answer.

The first fusing module includes:

a first dual-modality fusing submodule configured for inputting the audio embedding and the video embedding into a first fusing module to obtain the audio-video dual-modality feature;

a first inputting submodule configured for inputting the audio-video dual-modality feature into the baseline model;

a first three-modality fusing submodule configured for inputting the audio-video dual-modality feature processed by the baseline model and the question embedding into the first fusing module to obtain a first three-modality feature; and a first answer integration submodule configured for inputting the first three-modality feature into a first answer decoder for answer decoding to obtain the first answer probability distribution.

The second fusing module includes:

a second inputting submodule configured for inputting the video embedding and the question embedding into the first baseline model, and configured for inputting a second three-modality feature into the second baseline model;

a second three-modality fusing submodule configured for inputting the video single modality feature and the question single modality feature respectively processed by the first baseline model and the audio embedding into a second fusing module to obtain the second three-modality feature; and a second answer integration submodule configured for inputting the second three-modality feature processed by the second baseline model into a second answer decoder for answer decoding to obtain the second answer probability distribution.

The third fusing module includes:

a third dual-modality fusing submodule configured for inputting the video embedding and the question embedding into a third fusing module to obtain a video-question dual-modality feature;

a third inputting submodule configured for inputting the video-question dual-modality feature into the baseline model;

a third three-modality fusing submodule configured for inputting the video-question dual-modality feature processed by the baseline model and the audio embedding into the third fusing module to obtain a third three-modality feature; and a third answer integration submodule configured for inputting the third three-modality feature into a third answer decoder for answer decoding to obtain the third answer probability distribution.

The apparatus further includes:

a video embedding acquisition submodule configured for mathematically processing video information in a video clip based on a video preset algorithm to obtain a video data vector;

an audio embedding acquisition submodule configured for mathematically processing audio information in the video clip based on an audio preset algorithm to obtain an audio data vector; and a question embedding acquisition submodule configured for mathematically processing question information corresponding to the video clip based on a question preset algorithm to obtain a question data vector.

A third aspect of the embodiments of the present disclosure provides an electronic device, including a memory, a processor, and a computer program stored in the memory, wherein the processor, when executing the computer program, implements the steps of any of the hierarchical audio-visual feature fusing method for audio-visual question answering as described in the first aspect.

A fourth aspect of the embodiments of the present disclosure provides a computer-readable storage medium storing a computer program/instruction, wherein the computer program/instruction, when executed by a processor, implements the steps of any of the hierarchical audio-visual feature fusing method for audio-visual question answering as described in the first aspect.

A fifth aspect of the embodiments of the present disclosure provides a computer program product including a computer program/instruction, wherein the computer program/instruction, when executed by a processor, implements the steps of any of the hierarchical audio-visual feature fusing method for audio-visual question answering as described in the first aspect.

Beneficial Effects

The present disclosure provide the hierarchical audio-visual feature fusing method for audio-visual question answering and the product, wherein the audio-video dual-modality feature is input into the baseline model, and then the baseline model and the question embedding are fused for answer decoding to obtain the first answer probability distribution; the video embedding and the question embedding are input into the first baseline model, the first baseline model and the audio embedding are fused and inputted into the second baseline model, then answer decoding is performed on the second baseline model to obtain the second answer probability distribution; the video-question dual-modality feature is input into the baseline model, then the baseline model is fused with the audio embedding, and then answer decoding is performed to obtain the third answer probability distribution; and hierarchical integration is performed on the first answer probability distribution, the second answer probability distribution and the third answer probability distribution obtained to generate a final answer. The first answer probability distribution, the second answer probability distribution and the third answer probability distribution are obtained by respectively fusing the audio embedding in the baseline model at the early stage, the middle stage and the late stage, and hierarchical integration is performed on the answer probability distributions to generate the final answer. On one hand, the proportion of the audio characterization module in the whole question answering system is increased, which can improve the question answering capability; and on the other hand, an audio-visual fusing module is added, which can improve a complex semantic understanding performance, and get a better answer to the question of the video clip in the real complex scene.

BRIEF DESCRIPTION OF THE DRAWINGS

In order to more clearly illustrate the technical solutions of the embodiments of the present disclosure, the drawings that are required to describe the embodiments of the present disclosure will be briefly introduced below. Apparently, the drawings that are described below are only some embodiments of the present disclosure, and those of ordinary skills in the art can obtain other drawings according to these drawings without paying creative work.

DETAILED DESCRIPTION OF THE EMBODIMENTS

Hereinafter, the technical solutions in the embodiments of the present disclosure are illustrated clearly and completely with the accompanying drawings in the embodiments of the present disclosure. Apparently, the described embodiments are merely some but not all of the embodiments of the present disclosure. Based on the embodiments in the present disclosure, all other embodiments obtained by those of ordinary skills in the art without going through any creative work shall fall within the scope of protection of the present disclosure.

In the related art, an audio-visual question answering system is usually based on a former purely visual model framework, which only fuses audio features at an input position or an output position of a model, and thus lacks exploration of an effective mechanism of audio-visual feature fusing. On one hand, problems such as insufficient question answering capability are caused, and only suboptimal solutions are obtained. On the other hand, a complex semantic understanding performance in a real scene is reduced due to less design of an audio characterization module and an audio-visual fusing module, and is difficult to approach an understanding level of human.

In view of this, the embodiments of the present disclosure propose a hierarchical audio-visual feature fusing method for audio-visual question answering, which obtains a first answer probability distribution, a second answer probability distribution and a third answer probability distribution by respectively fusing audio embedding in a baseline model at an early stage, a middle stage and a late stage, and performs hierarchical integration on the answer probability distributions to generate a final answer, aiming at solving a problem of few audio characterization modules and a problem that video features and audio features cannot be effectively fused.

Figure 1:
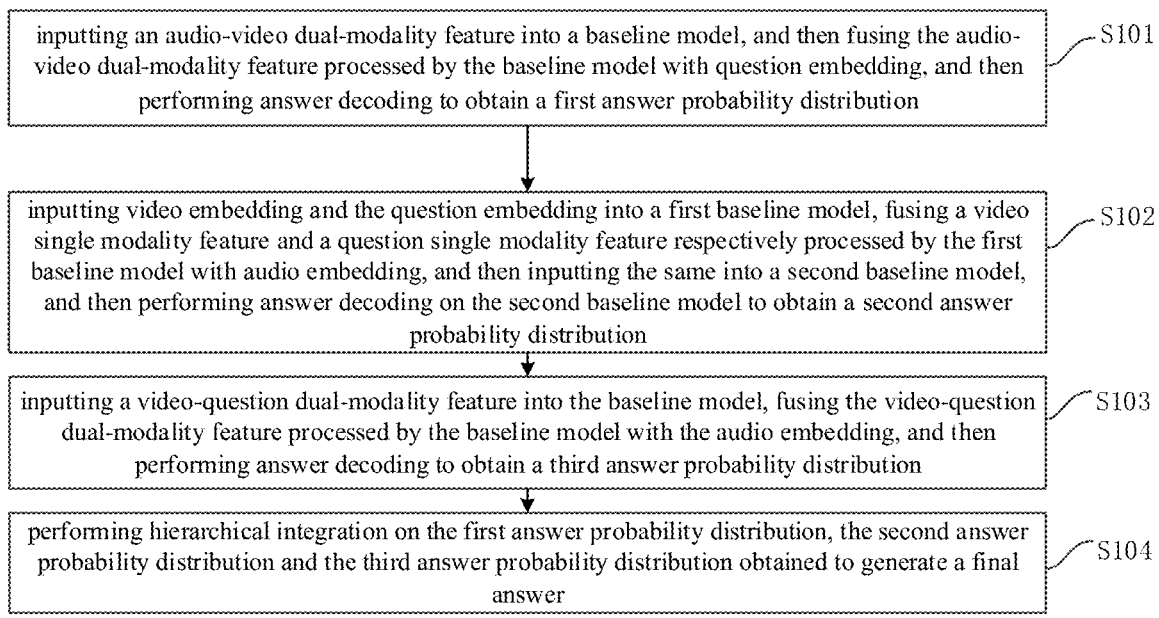
FIG. 1 is a flow chart of a hierarchical audio-visual feature fusing method for audio-visual question answering provided according to an embodiment of the present disclosure.

FIG. 1 shows a flow chart of a hierarchical audio-visual feature fusing method for audio-visual question answering. As shown in FIG. 1, the hierarchical audio-visual feature fusing method for audio-visual question answering includes the following steps of:

S101: inputting an audio-video dual-modality feature into a baseline model, fusing the audio-video dual-modality feature processed by the baseline model with question embedding, and then performing answer decoding to obtain a first answer probability distribution.

S102: inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution.

S103: inputting a video-question dual-modality feature into the baseline model, fusing the video-question dual-modality feature processed by the baseline model with the audio embedding, and then performing answer decoding to obtain a third answer probability distribution.

S104: performing hierarchical integration on the first answer probability distribution, the second answer probability distribution and the third answer probability distribution obtained to generate a final answer.

During concrete implementation, the model is established first. The embodiments of the present disclosure establish a hierarchical audio-visual feature fusing neural network based on the baseline model. Specifically, according to a difference of audio data introduction time, the embodiments of the present disclosure establish an early-stage audio-visual fusing branch, a middle-stage audio-visual fusing branch and a late-stage audio-visual fusing branch based on the baseline model.

First, training data need to be processed. Specifically, the training data is decomposed to obtain video information, audio information and question information. A preset algorithm is used to convert the video information into a corresponding vectors as video embedding, convert the audio information into a corresponding vector as audio embedding, and convert the question information into a corresponding vector as question embedding, wherein the question information is in the form of text in the training data, the audio information is an audio in a video clip, including all audios in the video clip such as background audio, and the video information is information corresponding to frame-by-frame video pictures in the video clip.

Figure 2:
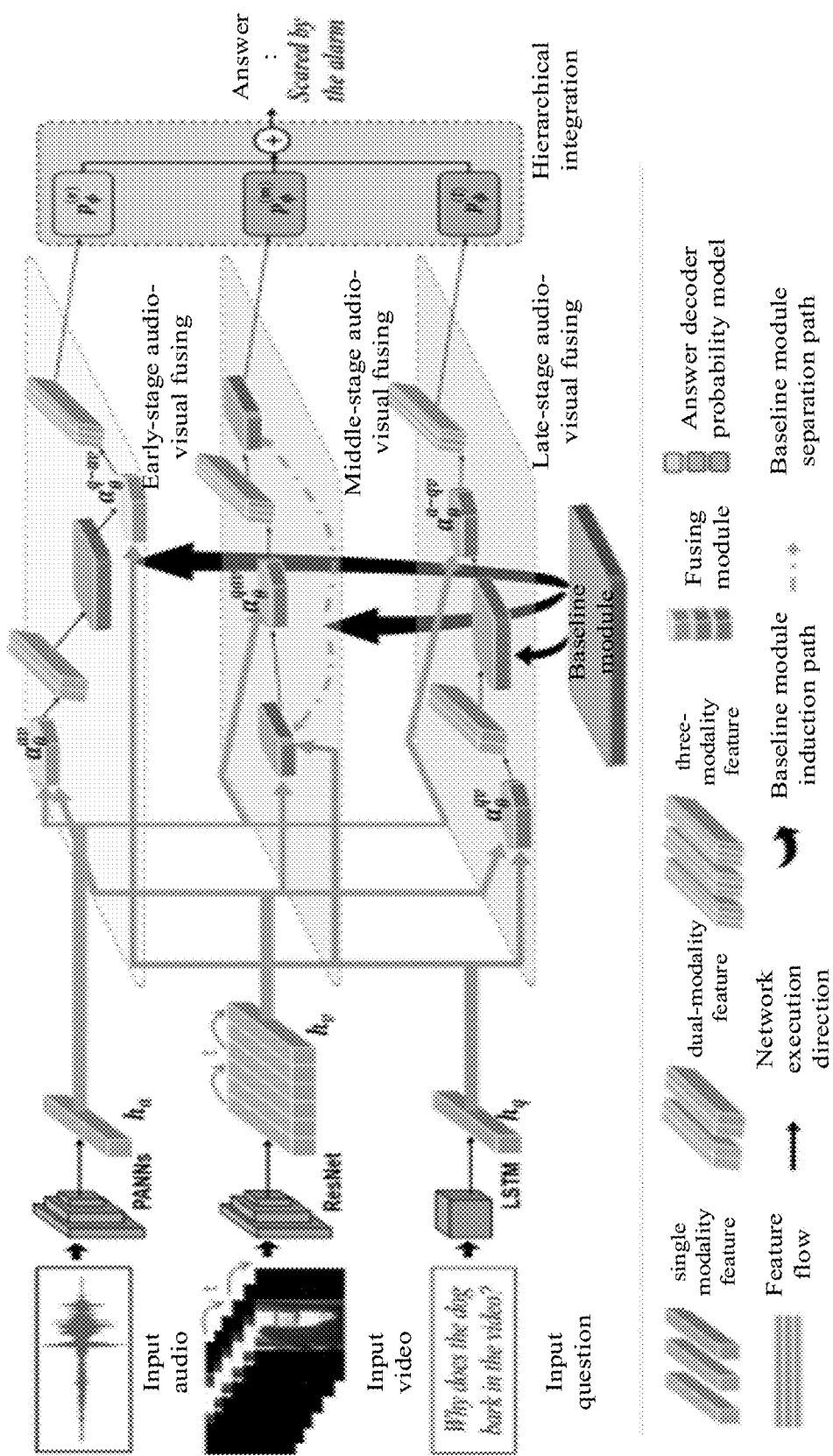
FIG. 2 is a schematic diagram of a hierarchical audio-visual feature fusing neural network provided according to an embodiment of the present disclosure.

When executing the step S101, the video embedding, the audio embedding and the question embedding in the training data are input into the early-stage audio-visual fusing branch according to a preset occasion. FIG. 2 shows a schematic diagram of a hierarchical audio-visual feature fusing neural network, as shown in the early-stage audio-visual fusing part in FIG. 2. Specifically, a flow of the early-stage audio-visual fusing branch is as follows:

the audio embedding and the video embedding obtained by decomposing the training data are input into a fusing module first, and the audio embedding and the video embedding are fused by the fusing module first to obtain the audio-video dual-modality feature; and then, the audio-video dual-modality feature is input into an original baseline model in the neural network. Then, the audio-video dual-modality feature processed by the baseline model and the question embedding is input into a first fusing module to obtain a first three-modality feature of audio-video-question. Finally, ting the first three-modality feature is input into a first answer decoder for answer decoding to obtain the first answer probability distribution.

In the flow of the early-stage audio-visual fusing branch, the audio embedding is fused with the video embedding at the beginning stage of the branch, and the baseline model is input. In the embodiments of the present disclosure, video and audio features are regarded as a whole and input into the baseline model at the beginning stage of the early-stage branch, and a semantic abstraction degree of the audio information in this case may be regarded as an information feature with a lower abstraction degree than low-level visual information.

When executing the step S102, as shown in the middle-stage audio-visual fusing part shown in FIG. 2, the video embedding, the audio embedding and the question embedding in the training data are input into the middle-stage audio-visual fusing branch according to a preset occasion. In order to ensure that the audio embedding is input and fused in the middle stage of the branch, the embodiments of the present disclosure divide the original baseline model into a first baseline model and a second baseline model divided according to its own structural features. There is no requirement for dividing the first baseline model and the second baseline model in the baseline model, only the modules in the baseline model need to be divided into two parts, and the specific division method is not limited in the present disclosure. Specifically, a flow of the middle-stage audio-visual fusing branch is as follows:

Firstly, the baseline model is divided into the first baseline model and the second baseline model. And then, the video embedding and the question embedding are input into the first baseline model as two separate information embedding, wherein the video embedding and the question embedding are not fused to obtain the dual-modality feature, but are respectively input into the first baseline model as two single modality features in this case. And then, the video single modality feature and the question single modality feature respectively processed by the first baseline model are input into a second fusing module together with the audio embedding, and the video single modality feature and the question single modality feature respectively processed by the first baseline model are fused with the audio embedding to obtain a second three-modality feature of audio-video-question; and then, the second three-modality feature are input into the second baseline model. Finally, the second baseline model input with the second three-modality feature is input into a second answer decoder for answer decoding to obtain the second answer probability distribution.

In the flow of the middle-stage audio-visual fusing branch, the baseline model is divided into two parts according to its own structural features, and the audio information is introduced between the first baseline model and the second baseline model, which ensures that the audio information is introduced in the middle stage of this flow. This flow may be deemed as considering the audio information as the information feature with a higher abstraction degree than the low-level visual information feature, and a higher semantic abstraction degree than the audio information feature in the flow of the early-stage audio-visual fusing branch at the same time.

When executing the step S103, as shown in the late-stage audio-visual fusing part in FIG. 2, the video embedding, the audio embedding and the question embedding in the training data are input into the late-stage audio-visual fusing branch according to a preset occasion. Specifically, a flow of the late-stage audio-visual fusing branch is as follows:

Firstly, the video embedding and the question embedding are input into a third fusing module for fusing to obtain a video-question dual-modality feature. And then, the video-question dual-modality feature is input into the baseline model again; the video-question dual-modality feature processed by the baseline model and the audio embedding is input into a third fusing module for fusing finally to obtain a third three-modality feature of audio-video-question; and the three-modality feature is input into a third answer decoder for answer decoding to obtain the third answer probability distribution.

In the flow of the late-stage audio-visual fusing branch, the audio information is fused with the baseline model at the end to obtain the third three-modality feature, so the audio information is added to the baseline model at the end of this flow. Therefore, a semantic abstraction degree of the audio information in the flow of the late-stage audio-visual fusing branch is higher than that in the flow of the middle-stage audio-visual fusing branch.

The above three branches constitute the hierarchical structure of the embodiments of the present disclosure. During concrete implementation, the present disclosure only needs to obtain the first answer probability distribution of the audio input and obtained in the early stage, the second answer probability distribution of the audio input and obtained in the middle stage and the third answer probability distribution of the audio input and obtained in the late stage. Therefore, there is no specific order requirement for the above-mentioned early stage, middle stage and late stage, and the flows of the three branches may be carried out simultaneously or sequentially. There is no specific restriction on the running order of the above flows of the three branches in the present disclosure.

In addition, a first fuser, a second fuser and a third fuser may be the same fuser or different fusers, which are not limited in the present disclosure. The first answer decoder, the second answer decoder and the third answer decoder may be the same answer decoder or different answer decoders, which are not limited in the present disclosure.

After obtaining the first answer probability distribution, the second answer probability distribution and the third answer probability distribution, the step S104 needs to be executed to perform hierarchical integration on the obtained probability distributions.

During concrete implementation, the first answer probability distribution, the second answer probability distribution and the third answer probability distribution obtained are integrated in a preset way, and the final answer is output. The specific preset integration mode may be to add the three answer probability distributions based on the same preset weight and then average the three answer probability distributions to get the final answer, or average the three answer probability distributions based on different preset weights to get the final answer. The specific weights and integration mode may be selected according to the actual situation, which are not specifically limited in the present disclosure.

The first answer probability distribution obtained above corresponds to an introduction position of the audio information in the early stage of the flow, and corresponds to low-level semantics. The second answer probability distribution corresponds to an introduction position of the audio information in the middle stage of the flow, and corresponds to high-level semantics. The third answer probability distribution corresponds to an introduction position of the audio information in the late stage of the flow, and corresponds to superlative-level semantics. The final answer obtained by the integration method integrates the audio semantics of positions in the early stage, the middle stage and the late stage at the same time, so that the final answer can reflect proportions of the audio information representation of different positions in the whole question answering system, and improve a question answering capability of the neural network obtained by training.

Through the above steps, loss function calculation is performed on the corresponding final answer and a standard answer obtained from the video data input in the training data, and network parameters in the hierarchical structure are optimized to obtain the optimized hierarchical audio-visual feature fusing neural network.

Then, a video clip to be tested is input into the optimized hierarchical audio-visual feature fusing neural network, and the video clip is processed in the early stage, the middle stage and the late stage respectively according to the above steps S101 to S104, and the corresponding final answer is output. The specific steps are referred to S101-S104, which are not described in detail here.

For example, when the method according to the embodiments of the present disclosure is applied to a scene of intelligent customer service agent, after a user inputs a question and a video clip, the intelligent customer service agent may convert the text question into question embedding, convert audio information in the video clip into audio embedding, and convert video pictures of each frame into video embedding, and input the question embedding, the audio information and the video embedding into the optimized hierarchical audio-visual feature fusing neural network. Then, a first answer probability distribution is obtained through a flow of an early-stage audio-visual fusing branch, a second answer probability distribution is obtained through a flow of a middle-stage audio-visual fusing branch, and a third answer probability distribution is obtained through a flow of a late-stage audio-visual fusing branch. The three probability distributions are added according to a weight of 0.3 and averaged to obtain a final answer and output the final answer to the user. In the hierarchical integration process, an audio information representation module is fused with the video information in the whole question answering system not only at the beginning stage, so the final answer obtained has a higher probability of accurately answering a question of a video clip in a real complex scene.

According to the embodiments of the present disclosure, the first answer probability distribution, the second answer probability distribution and the third answer probability distribution are obtained by respectively fusing the audio embedding in the baseline model at the early stage, the middle stage and the late stage, and hierarchical integration is performed on the answer probability distributions to generate the final answer. On one hand, the proportion of the audio characterization module in the whole question answering system is increased, which can improve the question answering capability; and on the other hand, an audio-visual fusing module is added, which can improve a complex semantic understanding performance, and get a better answer to the question of the video clip in the real complex scene.

Figure 3:
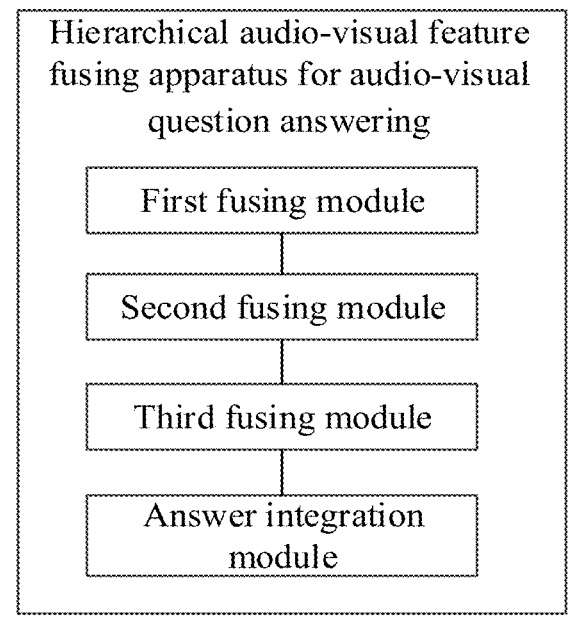
FIG. 3 is a schematic diagram of a hierarchical audio-visual feature fusing apparatus for audio-visual question answering provided according to an embodiment of the present disclosure.

Based on the same inventive concept, the embodiments of the present disclosure disclose a hierarchical audio-visual feature fusing apparatus for audio-visual question answering. FIG. 3 shows a schematic diagram of the hierarchical audio-visual feature fusing apparatus for audio-visual question answering, which, as shown in FIG. 3, includes the following modules:

a first fusing module configured for inputting an audio-video dual-modality feature into a baseline model, fusing the audio-video dual-modality feature processed by the baseline model with question embedding, and then performing answer decoding to obtain a first answer probability distribution;

a second fusing module configured for inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to its own structure;
a third fusing module configured for inputting a video-question dual-modality feature into the baseline model, fusing the video-question dual-modality feature processed by the baseline model with the audio embedding, and then performing answer decoding to obtain a third answer probability distribution; and
an answer integration module configured for performing hierarchical integration on the first answer probability distribution, the second answer probability distribution and the third answer probability distribution obtained to generate a final answer.

The first fusing module includes:
a First dual-modality fusing submodule configured for inputting the audio embedding and the video embedding into a first fusing module to obtain the audio-video dual-modality feature;
a first inputting submodule configured for inputting the audio-video dual-modality feature into the baseline model;
a first three-modality fusing submodule configured for inputting the audio-video dual-modality feature processed by the baseline model and the question embedding into the first fusing module to obtain a first three-modality feature; and
a first answer integration submodule configured for inputting the three-modality feature into a first answer decoder for answer decoding to obtain the first answer probability distribution.

The second fusing module includes:
a second inputting submodule three-modality configured for inputting the video embedding and the question embedding into the first baseline model, and configured for inputting a second three-modality feature into the second baseline model;
a second dual-modality fusing submodule configured for inputting the video single modality feature and the question single modality feature respectively processed by the first baseline model and the audio embedding into a second fusing module to obtain the second three-modality feature; and
a second answer integration submodule configured for inputting the second three-modality feature processed by the second baseline model into a second answer decoder for answer decoding to obtain the second answer probability distribution.

The third fusing module includes:
a third dual-modality fusing submodule configured for inputting the video embedding and the question embedding into a third fusing module to obtain a video-question dual-modality feature;
a third inputting submodule configured for inputting the video-question dual-modality feature into the baseline model;
a third three-modality fusing submodule configured for inputting the video-question dual-modality feature processed by the baseline model and the audio embedding into the third fusing module to obtain a third three-modality feature; and
a third answer integration submodule configured for inputting the third three-modality feature into a third answer decoder for answer decoding to obtain the third answer probability distribution.

The apparatus further includes:
a video embedding acquisition submodule configured for mathematically processing video information in a video clip based on a video preset algorithm to obtain a video data vector;
an audio embedding acquisition submodule configured for mathematically processing audio information in the video clip based on an audio preset algorithm to obtain an audio data vector; and
a question embedding acquisition submodule configured for mathematically processing question information corresponding to the video clip based on a question preset algorithm to obtain a question data vector.

Based on the same inventive concept, one another embodiment of the present disclosure discloses an electronic device including a memory, a processor, and a computer program stored in the memory, wherein the processor, when executing the computer program, implements the steps of the hierarchical audio-visual feature fusing method for audio-visual question answering in the embodiments of the present disclosure.

Based on the same inventive concept, one another embodiment of the present disclosure discloses a computer-readable storage medium storing a computer program/instruction, which, when executed by a processor, implements the steps of the hierarchical audio-visual feature fusing method for audio-visual question answering in the embodiments of the present disclosure.

Based on the same inventive concept, one another embodiment of the present disclosure discloses a computer program product including a computer program/instruction, which, when executed by a processor, implements the steps of the hierarchical audio-visual feature fusing method for audio-visual question answering in the embodiments of the present disclosure.

In the above-mentioned embodiments, it may be realized in whole or in part by software, hardware, firmware or any combination thereof. When it is implemented using software, it may be implemented in whole or in part in the form of a computer program product. The computer program product includes one or more computer instructions. When the computer program instructions are loaded and executed on a computer, the processes or functions according to the embodiments of the present disclosure are generated in whole or in part. The computer may be a general computer, a special purpose computer, a computer network, or other programmable apparatus. The computer instruction may be stored in a computer readable storage medium or transmitted from one computer readable storage medium to another computer readable storage medium, for example, the computer instruction may be transmitted from one website site, computer, server or data center to another website site, computer, server or data center by wired (e.g., coaxial cable, optical fiber, Digital Subscriber Line (DSL)) or wireless (e.g., infrared, wireless, microwave, etc.) manners. The computer-readable storage medium may be any available medium that a computer can access or a data storage device such as a server, a data center, or the like that includes one or more available media integration. The available medium may be a magnetic medium (e.g., floppy disk, hard disk, magnetic tape), an optical medium (e.g., DVD), or semi-conductor medium (e.g., Solid State Disk (SSD)) or the like.

Figure 4:
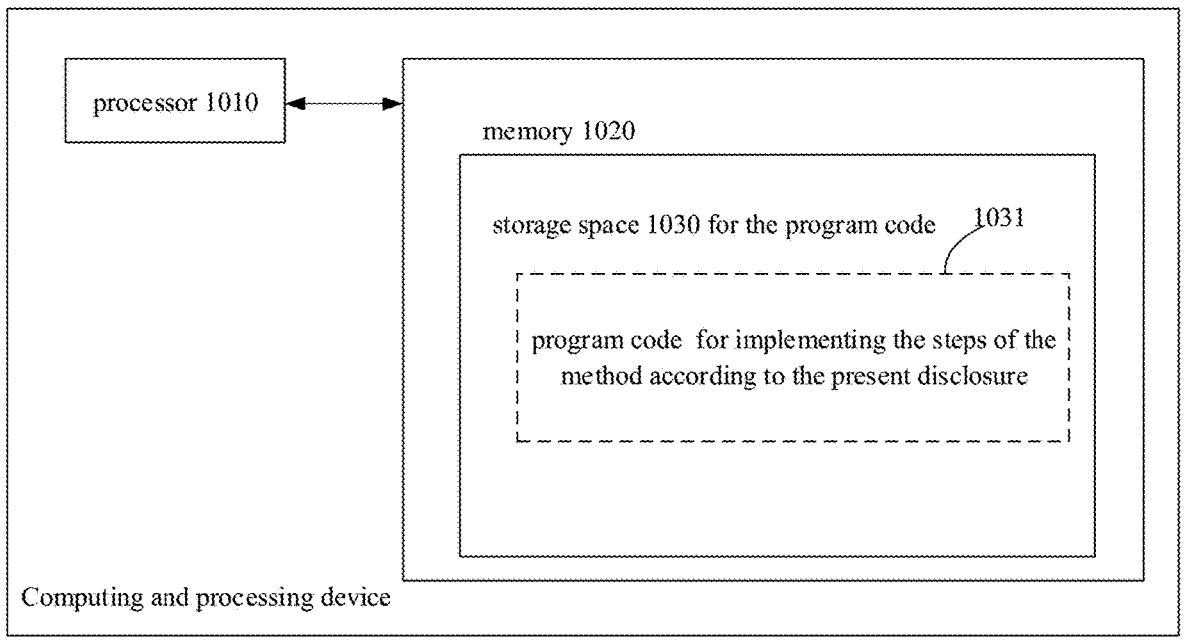
FIG. 4 schematically shows a block diagram of a computing processing device for executing the method according to the present disclosure.
Figure 5:
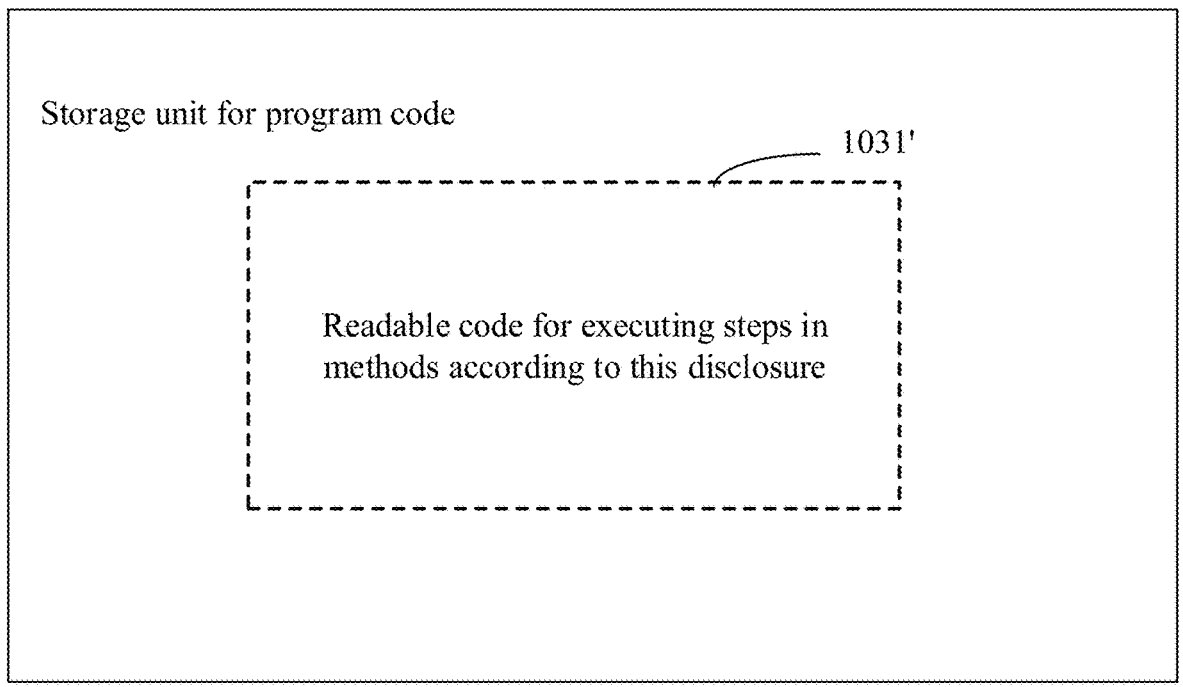
FIG. 5 schematically shows a storage unit for holding or carrying program codes for implementing the method according to the present disclosure.

For example, FIG. 4 shows a computing and processing device that can implement the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 5. The storage unit may have storage segments or storage spaces with similar arrangement to the memory 1020 of the computing and processing device in FIG. 4. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

It should be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or device.

All the embodiments in this specification are described in relevant ways, the same and similar parts between the embodiments may be referred to each other, and each embodiment focuses on the differences from other embodiments. Particularly, as for the system embodiment, since it is basically similar to the method embodiment, the description of the device embodiment is relatively simple. For relevant points, please refer to the partial description of the method embodiment.

The above description is merely preferred embodiments of the present disclosure, but is not intended to limit the protection scope of the present disclosure. Any modifications, equivalent substitutions, and improvements made within the spirit and principle of the present disclosure shall all fall within the scope of protection claimed by the present disclosure.

What is claimed is:

1. A hierarchical audio-visual feature fusing method for audio-visual question answering, comprising:
    inputting an audio-video dual-modality feature into a baseline model, and then fusing the audio-video dual-modality feature processed by the baseline model with question embedding, and then performing answer decoding to obtain a first answer probability distribution;
    inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to a structure of the baseline model;
    inputting a video-question dual-modality feature into the baseline model, fusing the video-question dual-modality feature processed by the baseline model with the audio embedding, and then performing answer decoding to obtain a third answer probability distribution; and
    performing hierarchical integration on the first answer probability distribution, the second answer probability distribution and the third answer probability distribution to generate a final answer.

2. The hierarchical audio-visual feature fusing method for audio-visual question answering according to claim 1, wherein performing hierarchical integration on the first answer probability distribution, the second answer probability distribution and the third answer probability distribution to generate the final answer comprises:
    adding and then averaging the first answer probability distribution, the second answer probability distribution and the third answer probability distribution based on preset weights to obtain the final answer, wherein a preset weight of the first answer probability distribution, a preset weight of the second answer probability distribution and a preset weight of the third answer probability distribution are equal.

3. The hierarchical audio-visual feature fusing method for audio-visual question answering according to claim 1, wherein inputting the audio-video dual-modality feature into the baseline model, fusing the audio-video dual-modality feature processed by the baseline model with the question embedding, and then performing answer decoding to obtain the first answer probability distribution comprises:
    inputting the audio embedding and the video embedding into a first fusing module to obtain the audio-video dual-modality feature;
    inputting the audio-video dual-modality feature into the baseline model;
    inputting the audio-video dual-modality feature processed by the baseline model and the question embedding into the first fusing module to obtain a first three-modality feature; and
    inputting the first three-modality feature into a first answer decoder for answer decoding to obtain the first answer probability distribution.

4. The hierarchical audio-visual feature fusing method for audio-visual question answering according to claim 3, comprising:
    the video embedding being a video data vector obtained by mathematically processing video information in a video clip based on a video preset algorithm;
    the audio embedding being an audio data vector obtained by mathematically processing audio information in the video clip based on an audio preset algorithm; and
    the question embedding being a question data vector obtained by mathematically processing question information corresponding to the video clip based on a question preset algorithm.

5. The hierarchical audio-visual feature fusing method for audio-visual question answering according to claim 1, wherein inputting the video embedding and the question embedding into the first baseline model, fusing the video single modality feature and the question single modality feature processed by the first baseline model with the audio embedding, and then inputting the same into the second baseline model, and then performing answer decoding on the second baseline model to obtain the second answer probability distribution comprises:

inputting the video embedding and the question embedding into the first baseline model;

inputting the video single modality feature and the question single modality feature respectively processed by the first baseline model and the audio embedding into a second fusing module to obtain a second three-modality feature;

inputting the second three-modality feature into the second baseline model; and inputting the second three-modality feature processed by the second baseline model into a second answer decoder for answer decoding to obtain the second answer probability distribution.

6. The hierarchical audio-visual feature fusing method for audio-visual question answering according to claim 1, wherein inputting the video-question dual-modality feature into the baseline model, fusing the video-question dual-modality feature processed by the baseline model with the audio embedding, and then performing answer decoding to obtain the third answer probability distribution comprises:

inputting the video embedding and the question embedding into a third fusing module to obtain the video-question dual-modality feature;

inputting the video-question dual-modality feature into the baseline model;

inputting the video-question dual-modality feature processed by the baseline model and the audio embedding into the third fusing module to obtain a third three-modality feature; and inputting the third three-modality feature into a third answer decoder for answer decoding to obtain the third answer probability distribution.

7. The hierarchical audio-visual feature fusing method for audio-visual question answering according to claim 1, comprising:

the video embedding being a video data vector obtained by mathematically processing video information in a video clip based on a video preset algorithm;

the audio embedding being an audio data vector obtained by mathematically processing audio information in the video clip based on an audio preset algorithm; and the question embedding being a question data vector obtained by mathematically processing question information corresponding to the video clip based on a question preset algorithm.

8. The hierarchical audio-visual feature fusing method for audio-visual question answering according to claim 2, comprising:

the video embedding being a video data vector obtained by mathematically processing video information in a video clip based on a video preset algorithm;

the audio embedding being an audio data vector obtained by mathematically processing audio information in the video clip based on an audio preset algorithm; and the question embedding being a question data vector obtained by mathematically processing question information corresponding to the video clip based on a question preset algorithm.

9. An electronic device, comprising a memory, a processor, and a computer program stored in the memory, wherein the processor, when executing the computer program, implements operations comprising:

inputting an audio-video dual-modality feature into a baseline model, and then fusing the audio-video dual-modality feature processed by the baseline model with question embedding, and then performing answer decoding to obtain a first answer probability distribution;

inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to a structure of the baseline model;

inputting a video-question dual-modality feature into the baseline model, fusing the video-question dual-modality feature processed by the baseline model with the audio embedding, and then performing answer decoding to obtain a third answer probability distribution; and performing hierarchical integration on the first answer probability distribution, the second answer probability distribution and the third answer probability distribution to generate a final answer.

10. The electronic device according to claim 9, wherein performing hierarchical integration on the first answer probability distribution, the second answer probability distribution and the third answer probability distribution to generate the final answer comprises:

adding and then averaging the first answer probability distribution, the second answer probability distribution and the third answer probability distribution based on preset weights to obtain the final answer, wherein a preset weight of the first answer probability distribution, a preset weight of the second answer probability distribution and a preset weight of the third answer probability distribution are equal.

11. The electronic device according to claim 9, wherein inputting the audio-video dual-modality feature into the baseline model, fusing the audio-video dual-modality feature processed by the baseline model with the question embedding, and then performing answer decoding to obtain the first answer probability distribution comprises:

inputting the audio embedding and the video embedding into a first fusing module to obtain the audio-video dual-modality feature;

inputting the audio-video dual-modality feature into the baseline model;

inputting the audio-video dual-modality feature processed by the baseline model and the question embedding into the first fusing module to obtain a first three-modality feature; and inputting the first three-modality feature into a first answer decoder for answer decoding to obtain the first answer probability distribution.

12. The electronic device according to claim 9, wherein inputting the video embedding and the question embedding into the first baseline model, fusing the video single modality feature and the question single modality feature processed by the first baseline model with the audio embedding, and then inputting the same into the second baseline model, and then performing answer decoding on the second baseline model to obtain the second answer probability distribution comprises:

inputting the video embedding and the question embedding into the first baseline model;

inputting the video single modality feature and the question single modality feature respectively processed by the first baseline model and the audio embedding into a second fusing module to obtain a second three-modality feature;

inputting the second three-modality feature into the second baseline model; and inputting the second three-modality feature processed by the second baseline model into a second answer decoder for answer decoding to obtain the second answer probability distribution.

13. The electronic device according to claim 9, wherein inputting the video-question dual-modality feature into the baseline model, fusing the video-question dual-modality feature processed by the baseline model with the audio embedding, and then performing answer decoding to obtain the third answer probability distribution comprises:

inputting the video embedding and the question embedding into a third fusing module to obtain the video-question dual-modality feature;

inputting the video-question dual-modality feature into the baseline model;

inputting the video-question dual-modality feature processed by the baseline model and the audio embedding into the third fusing module to obtain a third three-modality feature; and inputting the third three-modality feature into a third answer decoder for answer decoding to obtain the third answer probability distribution.

14. The electronic device according to claim 9, comprising:

the video embedding being a video data vector obtained by mathematically processing video information in a video clip based on a video preset algorithm;

the audio embedding being an audio data vector obtained by mathematically processing audio information in the video clip based on an audio preset algorithm; and the question embedding being a question data vector obtained by mathematically processing question information corresponding to the video clip based on a question preset algorithm.

15. A non-transitory computer-readable storage medium storing a computer program/instruction, wherein the computer program/instruction, when executed by a processor, implements operations comprising:

inputting an audio-video dual-modality feature into a baseline model, and then fusing the audio-video dual-modality feature processed by the baseline model with question embedding, and then performing answer decoding to obtain a first answer probability distribution;

inputting video embedding and the question embedding into a first baseline model, fusing a video single modality feature and a question single modality feature respectively processed by the first baseline model with audio embedding, and then inputting the same into a second baseline model, and then performing answer decoding on the second baseline model to obtain a second answer probability distribution, wherein the first baseline model and the second baseline model are two parts of the baseline model divided according to a structure of the baseline model;

inputting a video-question dual-modality feature into the baseline model, fusing the video-question dual-modality feature processed by the baseline model with the audio embedding, and then performing answer decoding to obtain a third answer probability distribution; and performing hierarchical integration on the first answer probability distribution, the second answer probability distribution and the third answer probability distribution to generate a final answer.

16. The non-transitory computer-readable storage medium according to claim 15, wherein performing hierarchical integration on the first answer probability distribution, the second answer probability distribution and the third answer probability distribution to generate the final answer comprises:

adding and then averaging the first answer probability distribution, the second answer probability distribution and the third answer probability distribution based on preset weights to obtain the final answer, wherein a preset weight of the first answer probability distribution, a preset weight of the second answer probability distribution and a preset weight of the third answer probability distribution are equal.

17. The non-transitory computer-readable storage medium according to claim 15, wherein inputting the audio-video dual-modality feature into the baseline model, fusing the audio-video dual-modality feature processed by the baseline model with the question embedding, and then performing answer decoding to obtain the first answer probability distribution comprises:

inputting the audio embedding and the video embedding into a first fusing module to obtain the audio-video dual-modality feature;

inputting the audio-video dual-modality feature into the baseline model;

inputting the audio-video dual-modality feature processed by the baseline model and the question embedding into the first fusing module to obtain a first three-modality feature; and inputting the first three-modality feature into a first answer decoder for answer decoding to obtain the first answer probability distribution.

18. The non-transitory computer-readable storage medium according to claim 15, wherein inputting the video embedding and the question embedding into the first baseline model, fusing the video single modality feature and the question single modality feature processed by the first baseline model with the audio embedding, and then inputting the same into the second baseline model, and then performing answer decoding on the second baseline model to obtain the second answer probability distribution comprises:

inputting the video embedding and the question embedding into the first baseline model;

inputting the video single modality feature and the question single modality feature respectively processed by the first baseline model and the audio embedding into a second fusing module to obtain a second three-modality feature;

inputting the second three-modality feature into the second baseline model; and inputting the second three-modality feature processed by the second baseline model into a second answer decoder for answer decoding to obtain the second answer probability distribution.

19. The non-transitory computer-readable storage medium according to claim 15, wherein inputting the video-question dual-modality feature into the baseline model, fusing the video-question dual-modality feature processed by the baseline model with the audio embedding, and then performing answer decoding to obtain the third answer probability distribution comprises:

inputting the video embedding and the question embedding into a third fusing module to obtain the video-question dual-modality feature;

inputting the video-question dual-modality feature into the baseline model;

inputting the video-question dual-modality feature processed by the baseline model and the audio embedding into the third fusing module to obtain a third three-modality feature; and inputting the third three-modality feature into a third answer decoder for answer decoding to obtain the third answer probability distribution.

20. The non-transitory computer-readable storage medium according to claim 15, comprising:

the video embedding being a video data vector obtained by mathematically processing video information in a video clip based on a video preset algorithm;

the audio embedding being an audio data vector obtained by mathematically processing audio information in the video clip based on an audio preset algorithm; and the question embedding being a question data vector obtained by mathematically processing question information corresponding to the video clip based on a question preset algorithm.

* * * * *